United States Patent
Chen et al.

(10) Patent No.: US 6,355,352 B1
(45) Date of Patent: Mar. 12, 2002

(54) FUSER MEMBER WITH LOW-TEMPERATURE-CURE OVERCOAT

(75) Inventors: Jiann H. Chen, Faiport; Joseph A. Pavlisko, Pittsford; Charles C. Anderson, Penfield, all of NY (US)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 09/608,362

(22) Filed: Jun. 30, 2000

(51) Int. Cl.$^7$ ............ B32B 27/26; C08L 83/04; C08L 27/16; C08L 27/18; C08L 27/20
(52) U.S. Cl. ............ 428/421; 428/422; 428/447; 525/100; 525/101; 525/102; 525/104; 524/408; 524/409; 524/410; 524/413; 524/434; 524/435
(58) Field of Search .................. 428/421, 422, 428/447; 525/100, 101, 102, 104; 524/408, 409, 410, 413, 434, 435

(56) References Cited

U.S. PATENT DOCUMENTS

| | | | |
|---|---|---|---|
| 4,272,179 A | 6/1981 | Seanor | 355/3 FU |
| 4,373,239 A | 2/1983 | Henry et al. | 29/132 |
| 4,430,406 A | 2/1984 | Newkirk et al. | 430/99 |
| 4,518,655 A | 5/1985 | Henry et al. | 428/329 |
| 4,568,275 A | 2/1986 | Sakurai | 432/60 |
| 4,853,737 A | 8/1989 | Hartley et al. | 355/289 |
| 4,970,098 A | 11/1990 | Ayala-Esquilin et al. | 428/36.4 |
| 4,999,221 A | 3/1991 | Eigenbrod et al. | 427/195 |
| 5,157,445 A | 10/1992 | Shoji et al. | 355/284 |
| 5,253,027 A | 10/1993 | Goto | 355/290 |
| 5,269,740 A | 12/1993 | Fitzgerald et al. | 492/56 |
| 5,292,562 A | 3/1994 | Fitzgerald et al. | 428/35.8 |
| 5,292,606 A | 3/1994 | Fitzgerald | 428/35.8 |
| 5,336,539 A | 8/1994 | Fitzgerald | 428/36.8 |
| 5,464,698 A | 11/1995 | Chen et al. | 428/421 |
| 5,464,703 A | * 11/1995 | Ferrar et al. | 428/421 |
| 5,466,533 A | 11/1995 | Fitzgerald et al. | 428/477 |
| 5,474,821 A | 12/1995 | Kass | 428/35.8 |
| 5,474,852 A | * 12/1995 | Fitzgerald et al. | 428/447 |

(List continued on next page.)

OTHER PUBLICATIONS

"Segmented Organosiloxane Copolymers", Polymer, 1984, V.25, pp. 1800–1806, by Yilgor et al.

"THV Fluoroplastic" by D. E. Hull, B. V. Johnson, I. P. Rodricks and J. B. Staley, Modern Fluoropolymers, edited by John Scheirs, 1997.

"Encyclopedia of Polymer Science and Engineering", vol. 17, pp. 829–835 on Thermoplastics and Fluoroplastics (J. Wiley & Sons 1989).

"Encyclopedia of Polymer Science and Engineering", vol. 7, pp. 257–269 on Fluorocarbon Elastomers (J. Wiley & Sons 1987).

Kirk–Othmer "Encyclopedia of Chemical Technology", vol. 8, pp. 990–1005 on Fluorocarbon Elastomers (J. Wiley & Sons 1993).

*Primary Examiner*—Vivian Chen

(57) ABSTRACT

A fuser member comprising a support and a layer overlying the support, the layer including a fluorocarbon thermoplastic random copolymer, a curing agent having a bisphenol residue, a particulate filler containing zinc oxide, an aminosiloxane, and antimony-doped tin oxide particles, the cured fluorocarbon thermoplastics random copolymer having subunits of:

$-(CH_2CF_2)x-, -(CF_2CF(CF_3))y-,$ and $-(CF_2CF_2)z-,$ wherein
x is from 1 to 50 or 60 to 80 mole percent,
y is from 10 to 90 mole percent,
z is from 10 to 90 mole percent, and
x+y+z equal 100 mole percent.

21 Claims, 1 Drawing Sheet

U.S. PATENT DOCUMENTS

| | | | |
|---|---|---|---|
| 5,480,724 A | 1/1996 | Fitzgerald et al. | 428/477 |
| 5,547,759 A | 8/1996 | Chen et al. | 428/421 |
| 5,582,917 A | 12/1996 | Chen et al. | 428/421 |
| 5,595,823 A | 1/1997 | Chen et al. | 428/421 |
| 5,599,631 A | 2/1997 | Chen et al. | 428/421 |
| 5,679,463 A * | 10/1997 | Visser et al. | 428/447 |
| 5,919,886 A | 7/1999 | Matsuda et al. | 525/276 |
| 5,948,479 A | 9/1999 | Adam et al. | 427/388.4 |
| 5,978,641 A * | 11/1999 | Wayman et al. | 399/329 |
| 6,020,450 A | 2/2000 | Matsuda et al. | 528/42 |
| 6,035,780 A | 3/2000 | Badesha et al. | 101/217 |
| 6,041,210 A * | 3/2000 | Chen et al. | 399/333 |
| 6,068,931 A | 5/2000 | Adam et al. | 428/469 |

* cited by examiner

FUSER MEMBER WITH LOW-TEMPERATURE-CURE OVERCOAT

CROSS REFERENCE TO RELATED APPLICATIONS

This application relates to commonly assigned application Ser. No. 09/609,562, of Chen et al, titled "Fluorocarbon Thermoplastic Random Copolymer Composition Curable At Low Temperatures", filed simultaneously herewith. This application relates to commonly assigned application Ser. No. 09/608,289, of Chen et al, titled "Method Of Preparing Low-Temperature-Cure Polymer Composition", filed simultaneously herewith. This application relates to commonly assigned application Ser. No. 09/608,818, of Chen et al, titled "Method Of Curing A Fuser Member Overcoat At Low Temperatures", filed simultaneously herewith.

FIELD OF THE INVENTION

This invention relates to fuser members useful for heat-fixing a heat-softenable toner material to a substrate. More particularly, the invention relates to materials usable as a toner release layer in a fuser member.

BACKGROUND OF THE INVENTION

Heat-softenable toners are widely used in imaging methods such as electrostatography, wherein electrically charged toner is deposited imagewise on a dielectric or photoconductive element bearing an electrostatic latent image. Most often in such methods, the toner is then transferred to a surface of another substrate, such as, e.g., a receiver sheet comprising paper or a transparent film, where it is then fixed in place to yield the final desired toner image.

When heat-softenable toners, comprising, e.g., thermoplastic polymeric binders, are employed, the usual method of fixing the toner in place involves applying heat to the toner once it is on the receiver sheet surface to soften it and then allowing or causing the toner to cool. One such well-known fusing method comprises passing the toner-bearing receiver sheet through the nip formed by a pair of opposing rolls, at least one of which (usually referred to as a fuser roll) is heated and contacts the toner-bearing surface of the receiver sheet in order to heat and soften the toner. The other roll (usually referred to as a pressure roll) serves to press the receiver sheet into contact with the fuser roll. In some other fusing methods, the configuration is varied and the "fuser roll" or "pressure roll" takes the form of a flat plate or belt. The description herein, while generally directed to a generally cylindrical fuser roll in combination with a generally cylindrical pressure roll, is not limited to fusing systems having members with those configurations. For that reason, the term "fuser member" is generally used herein in place of "fuser roll" and the term "pressure member" in place of "pressure roll".

The fuser member usually comprises a rigid support covered with a resilient material, which will be referred to herein as a "base cushion layer." The resilient base cushion layer and the amount of pressure exerted by the pressure member serve to establish the area of contact of the fuser member with the toner-bearing surface of the receiver sheet as it passes through the nip of the fuser member and pressure members. The size of this area of contact helps to establish the length of time that any given portion of the toner image will be in contact with and heated by the fuser member. The degree of hardness (often referred to as "storage modulus") and stability thereof, of the base cushion layer are important factors in establishing and maintaining the desired area of contact.

In some previous fusing systems, it has been advantageous to vary the pressure exerted by the pressure member against the receiver sheet and fuser member. This variation in pressure can be provided, for example in a fusing system having a pressure roll and a fuser roll, by slightly modifying the shape of the pressure roll. The variance of pressure, in the form of a gradient of pressure that changes along the direction through the nip that is parallel to the axes of the rolls, can be established, for example, by continuously varying the overall diameter of the pressure roll along the direction of its axis such that the diameter is smallest at the midpoint of the axis and largest at the ends of the axis, in order to give the pressure roll a sort of "bow tie" or "hourglass" shape. This will cause the pair of rolls to exert more pressure on the receiver sheet in the nip in the areas near the ends of the rolls than in the area about the midpoint of the rolls. This gradient of pressure helps to prevent wrinkles and cockle in the receiver sheet as it passes through the nip. Over time, however, the fuser roll begins to permanently deform to conform to the shape of the pressure roll and the gradient of pressure is reduced or lost, along with its attendant benefits. It has been found that permanent deformation (alternatively referred to as "creep") of the base cushion layer of the fuser member is the greatest contributor to this problem.

Particulate inorganic fillers have been added to base cushion layers to improve mechanical strength and thermal conductivity. High thermal conductivity is advantageous when the fuser member is heated by an internal heater, so that the heat can be efficiently and quickly transmitted toward the outer surface of the fuser member and toward the toner on the receiver sheet it is intended to contact and fuse. High thermal conductivity is not so important when the roll is intended to be heated by an external heat source.

Polyfluocarbon elastomers, such as vinylidene fluoride-hexafluoropropylene copolymers, are tough, wear resistant and flexible elastomers that have excellent high temperature resistance, but relatively high surface energies, which compromises toner release.

Fluorocarbon resins like polytetrafluoroethylene (PTFE) or fluorinated ethylenepropylene (FEP) are fluorocarbon plastics which have excellent release characteristics due to very low surface energy. Fluorocarbon resins are, however, less flexible and elastic than fluorocarbon elastomers and are therefore not suitable alone as the surface of the fuser roller.

U.S. Pat. No. 4,568,275 discloses a fuser roll having a layer of fluorocarbon elastomer and a fluorinated resin powder. However, the fluorocarbon elastomer that is disclosed is water dispersible and it is known that the mixture phase separates on coating so that the fluorinated resin that is used comes to the surface of the layer.

U.S. Pat. No. 5,253,027 discloses a fluorinated resin in a silicone elastomer. However, composites of this type exhibit unacceptable swell in the presence of silicone release oil.

U.S. Pat. No. 5,599,631 discloses a fuser roll having a layer of a fluorocarbon elastomer and a fluorocarbon resin. The drawback of this type of material is that the fluorocarbon resin powder tends to phase separate from the fluorocarbon elastomer thereby diminishing toner release.

U.S. Pat. No. 4,853,737 discloses a fuser roll having an outer layer comprising cured fluorocarbon elastomers containing pendant amine functional polydimethylsiloxane that are covalently bonded to the backbone of the fluorocarbon elastomer. However, the amine functional polydimethylsiloxane tends to phase separate from the fluorocarbon elastomer.

U.S. Pat. No. 5,582,917 discloses a fuser roll having a surface layer comprising a fluorocarbon-silicone polymeric composition obtained by heating a fluorocarbon elastomer with a fluorocarbon elastomer curing agent in the presence of a curable polyfunctional poly(C1–6 alkyl) siloxane polymer. However, the resulting interpenetrating network (IPN) has relatively high coefficient of friction and relatively low mechanical strength. After a period of use, the release property of the roller degrades and paper jams begin to occur.

U.S. Pat. No. 5,547,759 discloses a fuser roll having a release coating layer comprising an outermost layer of fluorocarbon resin uniquely bonded to a fluoroelastomer layer by means of a fluoropolymer containing a polyamide-imide primer layer. Although the release coating layer has relatively low surface energy and good mechanical strength the release coating layer lacks flexibility and elastic properties and can not produce high quality of images. In addition, sintering the fluorocarbon resin layer is usually accomplished by heating the coated fuser member to temperatures of approximately 350° C. to 400° C. Such high temperatures can have a detrimental effect on the underlying base cushion layer which normally comprises a silicone rubber layer. It would be desirable to provide a fuser member with an overcoat layer comprising a fluorocarbon resin layer without depolymerizing the silicone base cushion layer.

Polysiloxane elastomers have relatively high surface energy and relatively low mechanical strength, but are adequately flexible and elastic and can produce high quality fused images. After a period of use, however, the self release property of the roller degrades and offset begins to occur. Application of a polysiloxane fluid during roller use enhances the ability of the roller to release toner, but shortens roller life due to oil absorption. Oiled portions tend to swell and wear and degrade faster.

One type of material that has been widely employed in the past to form a resilient base cushion layer for fuser rolls is a condensation-crosslinked siloxane elastomer. Disclosure of filled condensation-cured poly(dimethylsiloxane) ("PDMS") elastomers for fuser rolls can be found, for example, in U.S. Pat. Nos. 4,373,239; 4,430,406; and 4,518, 655. U.S. Pat. No. 4,970,098 to Ayala-Esquillin et al. teaches a condensation cross-linked diphenylsiloxane-dimethylsiloxane elastomer having 40 to 55 weight percent zinc oxide, 5 to 10 weight percent graphite, and 1 to 5 weight percent ceric dioxide.

A widely used siloxane elastomer is a condensation-crosslinked PDMS elastomer, which contains about 32–37 volume percent aluminum oxide filler and about 2–6 volume percent iron oxide filler, and is sold under the trade name, EC4952, by the Emerson Cummings Co., U.S.A. It has been found that fuser rolls containing EC4952 cushion layers exhibit serious stability problems over time of use, i.e., significant degradation, creep, and changes in hardness, that greatly reduce their useful life. Nevertheless, materials such as EC4952 initially provide very suitable resilience, hardness, and thermal conductivity for fuser roll cushion layers.

U.S. Pat. No. 5,464,698 discloses toner fusing members which have a substrate coated with a fluorocarbon random copolymer containing tin oxide. Although these toner fusing members have proved effective and have desirable thermal conductivity, they have a problem in that there can be toner contamination.

Commonly-assigned U.S. Pat. No. 6,041,210 describes a toner fusing member having an overcoat layer including electrically conductive fine powders having a weight percent between about 30 to 80 weight percent. Although these toner fusing members have proved effective in suppressing electrostatic charge build up, they have a problem in that there can be toner contamination.

U.S. Pat. No. 5,595,823 discloses toner fusing members which have a substrate coated with a fluorocarbon random copolymer containing aluminum oxide. Although these toner fusing members have proved effective and have desirable thermal conductivity, they have a problem in that there can be toner contamination. The advantage of using the cured fluorocarbon thermoplastic random copolymer compositions is that they are effective for use with toner release agents which typically include silicone.

Thus, it has been extremely difficult to provide a fuser roller with, at the same time, good wear resistance, good release property, low coefficient of friction and low oil swell when exposed to release oil. It is toward a solution to this problem that the present invention is directed. It would also be desirable to provide a fuser member with an overcoat layer that includes a fluorocarbon thermoplastic random copolymer that can be cured at lower temperatures while providing good mechanical properties and low toner contamination.

SUMMARY OF THE INVENTION

It is an object of the invention to provide materials for forming a toner release layer.

It is another object of the present invention to provide a fuser member that contains a fluorocarbon thermoplastic random copolymer having improved toner release and mechanical strength that can be cured at reduced temperatures.

These objects are achieved by a fuser member comprising a support and a layer overlying the support, the layer including a fluorocarbon thermoplastic random copolymer, a curing agent having a bisphenol residue, a particulate filler containing zinc oxide, antimony-doped tin oxide particles and aminosiloxane, the cured fluorocarbon thermoplastics random copolymer having subunits of:

$$-(CH_2CF_2)x-, -(CF_2CF(CF_3))y-, \text{ and } -(CF_2CF_2)z-,$$

wherein x is from 1 to 50 or 60 to 80 mole percent, y is from 10 to 90 mole percent, z is from 10 to 90 mole percent, and x+y+z equal 100 mole percent.

The aminosiloxane is an amino finctional polydimethyl siloxane copolymer comprising aminfunctional units selected from the group consisting of (aminoethylaminopropyl) methyl, (aminopropyl) methyl and (aminopropyl) dimethyl.

Optionally, the layer may further contain a fluorinated resin selected from the group consisting of polytetrafluoroethylene and fluoroethylenepropylene having a number average molecular weight of between 50,000 and 50,000, 000. In addition, the layer may further optionally contain carbon black.

As will be demonstrated through examples, fuser members formed with a toner release layer having an unfilled fluorocarbon thermoplastic random copolymer have poor mechanical strength and toner release. However, it has been surprisingly found in the present invention that the addition of zinc oxide filler and an aminosiloxane polymer to a fluorocarbon thermoplastic random copolymer provides a fuser member having improved mechanical strength, toner release and reduced toner contamination. It was particularly surprising that the addition of antimony-doped tin oxide particles to these compositions significantly reduced the temperatures required for curing.

A further advantage of the present invention is the addition of specific optional release additives such as fluorinated resins to the fuser member compositions in the presence of bisphenol residue curing agent significantly improves the frictional characteristics of the fuser member.

DETAILED DESCRIPTION OF PARTICULAR EMBODIMENTS

Figure 1:
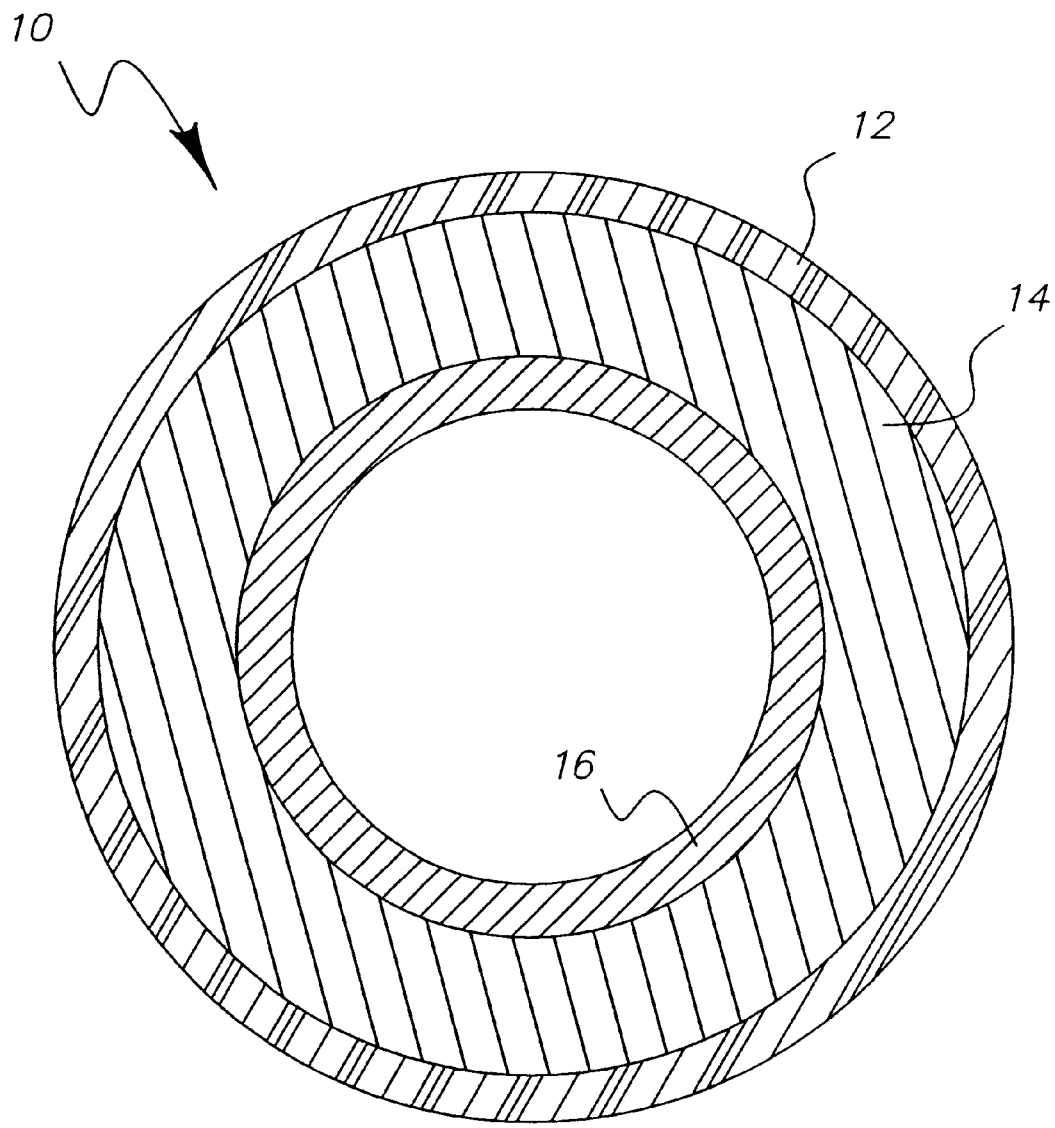
FIG. 1 is a cross sectional view of a fusing member in accordance with the present invention.

FIG. 1 shows a cross sectional view of a fuser member 10 which include fuser roller, pressure roller, oiler donor roller, oiler metering roller, pre-conditioning roller, etc. The support 16 is usually metallic such as stainless steel, steel, aluminum, etc.; however, the support 16 may also be made of a ceramic or plastic. The primary requisites for support 16 materials are that it provide the necessary stiffness, be able to support the force placed upon it, and be able to withstand whatever temperature to which it is subjected. Disposed above the support 6 lies one or more optional intermediate layers 14 which are characterized in the art as cushion layers. The outermost layer 12 is a toner release layer. In the event that a cushion layer 14 is not desired, then the outermost layer 12 is disposed directly over the support 16. The outermost layer 12 is the toner release layer, it includes a curing agent and a fluorocarbon random copolymer that is cured by the curing agent, the fluorocarbon random copolymer has subunits of:

wherein
  x is from 1 to 50 or 60 to 80 mole percent,
  y is from 10 to 90 mole percent,
  z is from 10 to 90 mole percent,
  x+y+z equal 100 mole percent.
-(CH$_2$CF$_2$) is (vinylidene fluoride subunit ("VF$_2$")),
-(CF$_2$CF(CF$_3$) is (hexefluoropropykene subunit ("HFP")), and
-(CF$_2$CF$_2$) is (tetrafluoroethylene subunit ("TFE")).

The layer further includes a bisphenol residue curing agent, a particulate filler having zinc oxide, and antimony-doped tin oxide particles and aminosiloxane.

The aminosiloxane is an amino functional polydimethyl siloxane copolymer comprising aminofunctional units selected from the group consisting of (aminoethylaminopropyl) methyl, (aminopropyl) methyl and (aminopropyl) dimethyl. It is a feature of the present invention that a fuser member formed with a toner release layer that includes a zinc oxide and an aminosiloxane filled polyfluorocarbon thermoplastic random copolymer has a moderately low surface energy and that by using a fluorocarbon thermoplastic polymeric composition an improved fuser member is provided. A further advantage of the present invention is that the addition of antimony-doped tin oxide particles to the toner release layer greatly reduces the temperatures required for curing. A still further advantage of the present invention is particular release additives such as a fluorinated resin can be added to the fluorocarbon thermoplastic random copolymer in the presence of a bisphenol residue curing agent to improve the coefficient of friction.

In these formulas, x, y, and z are mole percentages of the individual subunits relative to a total of the three subunits (x+y+z), referred to herein as "subunit mole percentages" (The curing agent can be considered to provide an additional "cure-site subunit", however, the contribution of these cure-site subunits is not considered in subunit mole percentages.) In the fluorocarbon thermoplastic copolymer, x has a subunit mole percentage of from 1 to 50 or 60 to 80 mole percent, y has a subunit mole percentage of from 10 to 90 mole percent, and z has a subunit mole percentage of from 10 to 90 mole percent. In a currently preferred embodiment of the invention, subunit mole percentages are: x is from 30 to 50 or 70 to 80, y is from 10 to 20, and z is from 10 to 50; or more preferably x is from 40 to 50, y is from 10 to 15, and z is 40 to 50. In the currently preferred embodiments of the invention, x, y, and z are selected such that fluorine atoms represent at least 65 percent of the total formula weight of the VF$_2$, HFP, and TFE subunits.

Preferably, a curable amino functional polydimethyl siloxane copolymer is used in the present invention and is cured concurrently with the fluorocarbon thermoplastic random copolymer to produce a coating suitable for use as the toner release layer of a fusing member. In accordance with the invention, coated fuser members have low energy surfaces which release toner images with minimal offset. Preferred curable amino functional polydimethyl siloxanes are bis(aminopropyl) terminated poly(dimethylsiloxane). Such oligomers are available in a series of molecular weights as disclosed, for example, by Yilgor et al., "Segmented Organosiloxane Copolymer", Polymer,1984, V.25, pp1800–1806.

A preferred class of curable amino functional polydimethyl siloxanes, based on availability, includes those having functional groups such as aminopropyl or aminoethylaminopropyl pendant from the siloxane backbone such as DMS-A11, DMS-A12, DMS-A15, DMS-A21 and DMS-A32 (sold by Gelest, Inc.) having a number- average molecular weight between about 850 to 27,000. Other curable amino functional polydimethyl siloxanes which can be used are disclosed in U.S. Pat. Nos. 4,853,737 and 5,157,445, the disclosures of which are hereby incorporated by reference.

Preferred compositions of the invention have a ratio of aminosiloxane polymer to fluorocarbon thermoplastic random copolymer between about 0.01 and 0.2 to 1 by weight, preferably between about 0.05 and 0.15 to 1. The composition is preferably obtained by curing a mixture comprising from about 50–80 weight percent of a fluorocarbon thermoplastic copolymer, 5–20 weight percent, most preferably about 5–10 weight percent, of a curable amino functional polydimethyl siloxane copolymer, 1–5 weight percent of a bisphenol residue, 1–20 weight percent of a zinc oxide acid acceptor type filler, 3–20 weight percent of antimony-doped tin oxide particles, 0 to 10 weight percent of carbon black, and 10–50 weight percent of a fluorinated resin release aid filler.

Curing of the fluorocarbon thermoplastic random copolymer is carried out at much lower temperatures compared to the well known conditions for curing vinylidene fluoride based fluorocarbon elastomer copolymers. For example, the cure of fluorocarbon elastomers is usually for 12–48 hours at temperatures of about 220 to 250° C. Typically, fluorocarbon elastomer coating compositions are dried until solvent free at room temperature, then gradually heated to about 230° C. over 24 hours, then maintained at that temperature for 24 hours. By contrast, the cure of the fluorocarbon thermoplastic random copolymer compositions of the current invention is about 5 to 10 hours at a temperature of about 25–275° C., preferably 25–120° C., and most preferably 25–50° C.

The outer layer includes a particulate filler comprising zinc oxide. The zinc oxide particles can be obtained from a convenient commercial source, e.g., Atlantic Equipment Engineers of Bergenfield, N.J. In a currently preferred embodiment of the invention, the particulate zinc oxide filler has a total concentration in the outer layer of from about 1 to 20 parts per hundred parts by weight of the fluorocarbon thermoplastic random copolymer (pph). Concentrations of zinc oxide much less than 1 part by weight may not provide the desired degree of stability to the layer. Concentrations of zinc oxide much greater than 20 parts by weight will render the layer too stiff to provide the desired area of contact with the toner-bearing receiver sheet. In a particular embodiment of the invention, the outer layer has 3 to 10 pph of zinc oxide.

The particle size of the zinc oxide filler does not appear to be critical. Particle sizes anywhere in the range of 0.1 to 100 micrometers have been found to be acceptable. In the examples presented below the zinc oxide particles were from 1 to 40 micrometers in diameter.

The outer layers of the invention also include antimony-doped tin oxide particles. These particles can be obtained from a convenient commercial source, e.g., Keeling & Walker, Stoke-on-Trent, UK; DuPont Co; or Mitsubishi Metals Inc., Japan. In a currently preferred embodiment, the antimony-doped tin oxide particles have a total concentration in the compositions of the invention of from about 3 to 20 parts per hundred parts by weight of the fluorocarbon thermoplastic random copolymer (pph). In a particularly preferred embodiment of the invention, the composition has 3 to 15 pph of antimony-doped tin oxide particles.

The particle size of the antimony-doped tin oxide particles does not appear to be critical. Particle sizes anywhere in the range of 0.05 to 10 micrometers are suitable. In the examples presented below the tin oxide particles were about 0.4 micrometers in diameter. The morphology or shape of the particles is not critical, for example, the particles may be essentially spherically in shape (granular) or they may be acicular in shape (e.g., a fiber or whisker)

The antimony concentration of the antimony-doped tin oxide particles is preferably 1 to 15 weight percent, most preferably 3 to 10 weight percent. In the examples presented below the antimony-doped tin oxide particles contained 6 to 9 weight percent antimony.

It was surprisingly found that the addition of the antimony-doped tin oxide particles to the fluorocarbon thermoplastic random copolymer compositions greatly reduced the temperatures needed to cure the fluoropolymer. While not wanting to be bound by theory, it is possible that the antimony acts as a catalyst for the curing reactions. Conventional fluoropolymer compositions that do not contain antimony-doped tin oxide parties have curing temperatures that are typically about 220 to 280° C., while the compositions of the invention may be cured at temperatures as low as room temperature.

The compositions of the invention optionally contain a carbon black added at a concentration of 0 to 10 parts per hundred parts of the fluorocarbon thermoplastic random copolymer. Any conventional carbon black may be used, for example Thermax™ N-990 available from R.T.Vanderbilt Co.

To prepare the outer layer of the invention, the zinc oxide particles and antimony-doped tin oxide particles are mixed with the uncured fluorocarbon thermoplastic random copolymer, aminosiloxane, a bisphenol residue curing agent, and any other additives, such as fluorinated resin and carbon black, shaped over the base cushion layer and cured. The fluorocarbon thermoplastic random copolymer is cured by crosslinking with basic nucleophile addition curing. Basic nucleophilic cure systems are well known and are discussed, for example, in U.S. Pat. No. 4,272,179. One example of such a cure system combines a bisphenol residue as the curing agent and an organophosphonium salt, as an accelerator. The fluorinated resins which include polyterafluoroethylene (PTFE) or Fluoethylenepropylene (FEP) are commerically available from Dupont.

The crosslinker is incorporated into the polymer as a cure-site subunit, for example, bisphenol residues. Other examples of nucleophilic addition cure systems are sold commercially as DIAK No. I (hexamethylenediamine carbamate) and DIAK No. 3 (N,N'-dicinnamylidene-1,6-hexanediamine) by Dupont.

Suitable fluorocarbon thermoplastic random copolymers are available commercially. In a particular embodiment of the invention, a vinylidene fluoride-co-tetrafluoroethylene co-hexafluoropropylene was used which can be represented as -(VF)(75)-TFE) (10)-(HFP)(25)-. This material is marketed by Hoechst Company under the designation "THV Fluoroplastics" and is referred to herein as "THV". In another embodiment of the invention, a vinylidene fluoride-co-tetrafluoroethylene-co-hexafluoropropylene was used which can be represented as -(VF)(49)-(TFE) (41)-(HFP) (10)-. This material is marketed by Minnesota Mining and Manufacturing, St. Paul, Minn., under the designation "3M THV" and is referred to herein as "THV-200". Other suitable uncured vinylidene fluoride-cohexafluoropropylenes and vinylidene fluoride-co-tetrafluoroethylene-cohexafluoropropylenes are available, for example, THV-400, THV-500 and THV-300.

In general, THV Fluoroplastics are set apart from other melt-processable fluoroplastics by a combination of high flexibility and low process temperature. With flexural modulus values between 83 Mpa and 207 Mpa, THV Fluoroplastics are the most flexible of the fluoroplastics.

The molecular weight of the uncured polymer is largely a matter of convenience, however, an excessively large or excessively small molecular weight would create problems, the nature of which are well known to those skilled in the art. In a preferred embodiment of the invention the uncured polymer has a number average molecular weight in the range of about 100,000 to 200,000.

The fuser member is constructed forming a toner release layer on an optional base cushion provided on a support comprising the steps of:
(a) providing a support;
(a) providing a mixture having:
  (i) a fluorocarbon thermoplastics random copolymer having subunits of:

-(CH$_2$CF$_2$)x-, -(CF$_2$CF(CF$_3$)y-, and (-CF$_2$CF$_2$)z-,
   wherein
   x is from 1 to 50 or 60 to 80 mole percent,
   y is from 10 to 90 mole percent,
   z is from 10 to 90 mole percent,
   x+y+z equal 100 mole percent;
  (ii) a filler comprising zinc oxide;
  (iii) a curable amino functional polydimethyl siloxane copolymer comprising aminofunctional units selected from the group consisting of (aminoethylaminopropyl) methyl, (aminopropyl) methyl and aminopropyl) dimethyl;

(iv) antimony-doped tin oxide particles;
(v) a bisphenol residue curing agent; and
(c) applying the mixture to the support and curing the applied mixture to crosslink the fluorocarbon thermoplastic random copolymer.

In cases where it is intended that the fuser member be heated by an internal heater, it is desirable that the outer layer have a relatively high thermal conductivity, so that the heat can be efficiently and quickly transmitted toward the outer surface of the fuser member that will contact the toner intended to be fused. (Depending upon relative thickness, it is generally even more desirable that the base cushion layer and any other intervening layers have a relatively high thermal conductivity. Suitable materials for the base cushion layer are discussed below).

Some fusing systems use a release oil, such as a PDMS oil, to prevent offset, that is, to aid the roll in releasing from the toner it contacts during the fusing operation. During use, the oil is continuously coated over the surface of the fuser member in contact with the toner image. The fuser member of the invention can be used with polydimethylsiloxane, amino functionalized polydimethylsiloxane or mercapto functionalized polydimethylsiloxane release oils at normally used application rates or at reduced application rates, from about 0.5 mg/copy to 10 mg/copy (the copy is 8.5 by 11 inch 20 pound bond paper).

The outer layer of the fuser member of the invention is substantially resistant to release oil induced swelling. In a preferred embodiment of the invention, the change in size due to swelling is less than 0.1 to 1.0 percent. In an even more preferred embodiment of the invention, the change in size due to swelling is less than 0.01 to 0.1 percent.

The thickness of the base cushion and outer layers and the composition of the base cushion layer can be chosen so that the base cushion layer can provide the desired resilience to the fuser member, and the outer layer can flex to conform to that resilience. The thickness of the base cushion and outer layers will be chosen with consideration of the requirements of the particular application intended. Usually, the outer layer would be thinner than the base cushion layer. For example, base cushion layer thicknesses in the range from 0.6 to 5.0 mm have been found to be appropriate for various applications. In some embodiments of the present invention, the base cushion layer is about 2.5 mm thick, and the outer layer is from about 25 to 30 micrometers thick.

Suitable materials for the base cushion layer include any of a wide variety of materials previously used for base cushion layers, such as the condensation cured polydimethylsiloxane marketed as EC4952 by Emerson Cummings. An example of a condensation cured silicon rubber base cushion layer is GE 4044 marketed by General Electric of Waterford, N.Y. An example of an addition cured silicone rubber is Silastic J RTV marketed by Dow Coming applied over a silane primer DC-1200 also marketed by Dow Coming.

In a particular embodiment of the invention, the base cushion is resistant to cyclic stress induced deformation and hardening. Examples of suitable materials to reduce cyclic stress induced deformation and hardening are filled condensation-crosslinked PDMS elastomers disclosed in U.S. Pat. No. 5,269,740, titled "Fuser Roll For Fixing Toner To A Substrate", U.S. Pat. No. 5,292,606, titled "Fuser Roll For Fixing Toner To A Substrate", U.S. Pat. No. 5,292,562, titled "Fuser Roll For Fixing Toner To A Substrate", U.S. Pat. No. 5,480,724, titled "Fuser Roll For Fixing Toner To A Substrate Comprising Tin Oxide Fillers", U.S. Pat. No. 5,336,539, titled "Fuser Roll Containing Nickel Oxide Particles For Fixing Toner To A Substrate". These materials all show reasonable thermal conductivities and much less change in hardness and creep than EC4952 or the PDMS elastomer with aluminum oxide filler. Additional suitable base cushions are disclosed in U.S. Pat. No. 5,466,533, entitled "Zinc Oxide Filled Diphenylsiloxane-Dimethylsiloxane Fuser Roll for Fixing Toner to a Substrate", U.S. Pat. No. 5,474,852, entitled "Tin Oxide Filled Diphenylsiloxane-Dimethylsiloxane Fuser Roll for Fixing Toner to a Substrate", U.S. Pat. No. 5,464,703, entitled "Tin Oxide Filled Dimethylsiloxane-Fluoroalkylsiloxane Fuser Roll for Fixing Toner to a Substrate". The patents and patent applications mentioned in this paragraph are hereby incorporated herein by reference.

The support of the fuser member is usually cylindrical in shape. It comprises any rigid metal or plastic substance. Metals are preferred when the fuser member is to be internally heated, because of their generally higher thermal conductivity. Suitable support materials include, e.g., aluminum, steel, various alloys, and polymeric materials such as thermoset resins, with or without fiber reinforcement. The support which has been conversion coated and primed with metal alkoxide primer in accordance with U.S. Pat. No. 5,474,821, which is hereby incorporated by reference.

The fuser member is mainly described herein in terms of embodiments in which the fuser member is a fuser roll having a support, a base cushion layer overlying the support, and an outer layer superimposed on the base cushion. The invention is not, however, limited to a roll, nor is the invention limited to a fusing member having a support bearing two layers: the base cushion layer and the outer layer. The fuser member of the invention can have a variety of outer configurations and layer arrangements known to those skilled in the art. For example, the base cushion layer could be eliminated or the outer layer described herein could be overlaid by one or more additional layers.

The invention is further illustrated by the following Examples and Comparative Example.

EXAMPLES 1–3

150 grams of Fluorocarbon thermoplastic random copolymer THV 200A, 1.05 grams of zinc oxide, 15.4 grams of fluorinated resin, and 4.90 grams of aminosiloxane were mixed into 230 grams of methyl ethyl ketone in a milling crock as indicated (amounts listed as parts per hundred parts of THV200A) in Table 1. THV200A is a commercially available fluorocarbon thermoplastic random copolymer which is sold by 3M Corporation. The zinc oxide particles can be obtained from convenient commercial source, e.g., Atlantic Equipment Engineers of Bergenfield, N.J. The amino siloxane DMS-A21 is commercially available from Gelest, Inc. The fluorinated resin is fluoroethylenepropylene (FEP) and is commercially available from Dupont. Into the above mixture antimony-doped tin oxide particles and carbon black were added and the formulations were mixed on a two-roll mill for 48 hours to form a dispersion (the amounts of the antimony-doped tin oxide particles and carbon black are given in Table 1). The antimony-doped tin oxide particles are Keeling & Walker Inc. CPM375 having an average particle size of about 0.4 $\mu$m and an antimony content of 6–9 weight %. The carbon black is Thermax™ available from R.T. Vanderbilt Co.

Each of the above dispersions were mixed with 1.05 grams (3 pph) of curative 50 (a bisphenol residue, DuPont) and roll milled for 2–3 minutes. The dispersions were then immediately cast into a film and allowed to dry for several hours. The resulting layers had a thickness of several mils. Afterwards the layers were cured using the conditions listed in Table 2.

COMPARATIVE EXAMPLE 1

To prepare Comparative Example 1 substantially the same procedures were followed as in Example 1–3, with the following exception. As indicated in the composition listed in Table 1, Comparative Example 1 did not contain antimony-doped tin oxide or carbon black. The curing conditions employed are given in Table 2.

TABLE 1

| Sample | THV 200A | ZnO | Amino-siloxane | FEP | CMP375 Tin oxide | Carbon black |
|---|---|---|---|---|---|---|
| Example 1 | 100 | 3 | 14 | 44 | 8 | 2 |
| Example 2 | 100 | 3 | 14 | 44 | 8 | 0 |
| Example 3 | 100 | 3 | 14 | 44 | 8 | 2 |
| Comparative Example 1 | 100 | 3 | 14 | 44 | 0 | 0 |

TABLE 2

| Sample | Post Cured | Max. Temp. For Curing |
|---|---|---|
| Example 1 | No | 25° C. |
| Example 2 | No | 25° C. |
| Example 3 | Yes | 275° C. |
| Comparative Example 1 | No | 25° C. |

DMA: Testing Method

The samples were tested on a Rheometrics RSA II Dynamic Mechanical Analyzer (DMA) and required a sample geometry of 7.5 mm×23 mm with a thickness between 30 microns to 2000 microns. The free standing films were tested at 10 Hz and a strain of 0.07%. The test was recorded over a temperature scan of –100° C. to 200° C. Over the temperature scan an oscillatory strain is applied to the sample and the resulting stress is measured. These values are related to material properties by E' and E" (Storage and Loss Moduli, respectively). As a result of DMA testing, the storage modulus (E') at three different temperatures is determined and the behavior of the material at typical toner fusing temperatures is observed.

TABLE 3

Storage Modulus Versus Temperature

| Sample | MPa @ 80° C. | MPa @ 140° C. | MPa @ 175° C. |
|---|---|---|---|
| Example 1 | 28.0 | 7.05 | 7.05 |
| Example 2 | 20.0 | 4.50 | 4.50 |
| Example 3 | 11.5 | 4.8 | 4.8 |
| Comparative Example 1 | 11.0 | 0.9 | 0.3 |

Table 3 shows a comparison between the cured fluorocarbon thermoplastic random copolymer layers of the invention and Comparative Example 1 which did not contain antimony-doped tin oxide. The comparative example, despite containing the bisphenol residue curing agent, did not cure at low temperature because it did not contain the antimony-doped tin oxide which apparently acts as an accelerator for curing. In terms of the modulus at the 175° C. fusing temperature, the cured fluorocarbon thermoplastic random copolymer layers of the invention provide a significant improvement in mechanical properties at the fusing temperature. Also, the compositions of the invention can also be cured at conventional high temperatures as in Example 3 without any significant deleterious effect on properties.

The invention has been described in detail with particular reference to certain preferred embodiments thereof, but it should be appreciated that variations and modifications can be effected within the scope of the invention.

What is claimed is:

1. A fuser member comprising a support and a layer overlying the support, the layer including a fluorocarbon thermoplastic random copolymer, a curing agent having a bisphenol residue, a particulate filler containing zinc oxide, antimony-doped tin oxide particles and an aminosiloxane, the cured fluorocarbon thermoplastics random copolymer having subunits of:

wherein
x is from 1 to 50 or 60 to 80 mole percent,
y is from 10 to 90 mole percent,
z is from 10 to 90 mole percent, and
x+y+z equal 100 mole percent.

2. The fusing member of claim 1 wherein the aminosiloxane is an amino functional polydimethyl siloxane copolymer.

3. The fusing member of claim 2 wherein the amino finctional polydimethyl siloxane copolymer comprises amino functional units selected from the group consisting of (aminoethylaminopropyl) methyl, (aminopropyl) methyl and (aminopropyl) dimethyl.

4. The fuser member of claim 2 wherein the fluorocarbon thermoplastic random copolymer is cured by bisphenol residues.

5. The fusing member of claim 1 wherein the amino siloxane has a total concentration in the layer of from 1 to 20 parts by weight per 100 parts of the fluorocarbon thermoplastic random copolymer.

6. The fuser member of claim 1 wherein the aminosiloxane has a total concentration in the layer of from 5 to 15 parts by weight per 100 parts of the fluorocarbon thermoplastic random copolymer.

7. The fuser member of claim 1 wherein the aminosiloxane has a total concentration in the layer of from 10 to 15 parts by weight per 100 parts of the fluorocarbon thermoplastic random copolymer.

8. The fuser member of claim 1 wherein the zinc oxide has a total concentration in the layer of from 1 to 20 parts by weight per 100 parts of the fluorocarbon thermoplastic random copolymer.

9. The fuser member of claim 1 wherein the zinc oxide has a total concentration in the layer of from 3 to 15 parts by weight per 100 parts of the fluorocarbon thermoplastic random copolymer.

10. The fuser member of claim 1 further including a cushion layer between the support and the layer.

11. The fuser member of claim 1 wherein the fluorocarbon thermoplastic random copolymer is nucleophilic addition cured.

12. The fuser member of claim 1 wherein x is from 30 to 50 mole percent, y is from 10 to 90 mole percent, and z is from 10 to 90 mole percent.

13. The fuser member of claim 1 wherein x is from 40 to 50 mole percent and y is from 10 to 15 mole percent.

14. The fuser member of claim 1 wherein z is greater than 40 mole percent.

15. The composition of claim 1 wherein the antimony-doped tin oxide particles have a total concentration of from 3 to 20 parts by weight per 100 parts of the fluorocarbon thermoplastic random copolymer.

16. The composition of claim 1 wherein the antimony-doped tin oxide particles comprise 3 to 10 weight percent antimony.

17. The fuser member of claim 1 wherein the fluorocarbon thermoplastic random copolymer further comprises a fluorinated resin.

18. The fuser member of claim 17 wherein the fluorinated resin has a number average molecular weight between 50,000 and 50,000,000.

19. The fuser member of claim 17 wherein the ratio of fluorocarbon thermoplastic random copolymer to fluorinated resin is between 1:1 and 50: 1.

20. The fuser member of claim 17 wherein the fluorinated resin is polytetrafluoroethylene or fluoroethylenepropylene.

21. The composition of claim 1 wherein the fluorocarbon thermoplastic random copolymer further comprises carbon black.

* * * * *